United States Patent
Betzner et al.

(10) Patent No.: US 6,588,931 B2
(45) Date of Patent: Jul. 8, 2003

(54) TEMPERATURE SENSOR WITH FLEXIBLE CIRCUIT SUBSTRATE

(75) Inventors: Timothy M. Betzner, Kokomo, IN (US); David P. O'Connell, Menomonee Falls, WI (US); Peter J. Straub, St. Marys, PA (US); Michael J. Boehm, Warren, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/732,287

(22) Filed: Dec. 7, 2000

(65) Prior Publication Data

US 2002/0071475 A1 Jun. 13, 2002

(51) Int. Cl.[7] .............................. G01K 7/00; G01K 1/16
(52) U.S. Cl. ...................... 374/185; 374/208; 338/22 R; 429/877
(58) Field of Search ................................ 374/185, 208; 338/25, 28, 22 R; 439/877, 878

(56) References Cited

U.S. PATENT DOCUMENTS

| | | | | |
|---|---|---|---|---|
| 3,974,696 A | * | 8/1976 | Fitzmayer ..................... 73/352 |
| 4,246,786 A | * | 1/1981 | Wiemer et al. .......... 73/362 AR |
| 4,317,367 A | * | 3/1982 | Schonberger .......... 73/362 AR |
| 4,453,835 A | * | 6/1984 | Clawson et al. ............ 374/185 |
| 4,743,121 A | * | 5/1988 | Takagi et al. ................ 374/163 |
| 4,987,579 A | * | 1/1991 | Yoshinaka et al. ............ 377/25 |
| 5,037,488 A | * | 8/1991 | Wienand ..................... 136/230 |
| 5,046,857 A | * | 9/1991 | Metzger et al. ............. 374/135 |
| 5,149,200 A | * | 9/1992 | Shiokawa et al. ............ 338/28 |
| 5,165,798 A | * | 11/1992 | Watabane .................... 374/208 |
| 5,190,048 A | * | 3/1993 | Wilkinson ................... 128/724 |
| 5,340,019 A | * | 8/1994 | Bohan, Jr. et al. .......... 374/208 |
| 5,415,038 A | * | 5/1995 | Rynhart et al. ................ 73/431 |
| 5,449,234 A | * | 9/1995 | Gipp et al. .................. 374/185 |
| 5,462,359 A | * | 10/1995 | Reichl et al. ................ 374/148 |
| 5,660,473 A | * | 8/1997 | Noma et al. ................. 374/145 |
| 5,749,656 A | * | 5/1998 | Boehm et al. ............... 374/185 |
| 5,753,835 A | * | 5/1998 | Gustin ......................... 374/208 |
| 5,823,680 A | * | 10/1998 | Kato et al. ................... 374/185 |
| 6,082,895 A | * | 7/2000 | Janicek ........................ 374/185 |
| 6,083,174 A | * | 7/2000 | Brehmeier-Flick et al. . 600/561 |
| 6,152,597 A | * | 11/2000 | Potega ......................... 374/185 |
| 6,259,350 B1 | * | 7/2001 | Mueller-Fiedler et al. .... 338/25 |
| 6,354,736 B1 | * | 3/2002 | Cole et al. ................... 374/185 |

FOREIGN PATENT DOCUMENTS

| | | | | |
|---|---|---|---|---|
| WO | WO87/00917 | * | 2/1987 | ............. G01F/1/68 |

* cited by examiner

Primary Examiner—Diego Gutierrez
Assistant Examiner—Gail Verbitsky
(74) Attorney, Agent, or Firm—Thomas N. Twomey

(57) ABSTRACT

A temperature sensor incorporating flexible circuit technology. A flexible circuit sensor subassembly is composed of a flexible printed circuit substrate on which is printed a sensor circuit. In a preferred example the flexible circuit sensor subassembly, the sensor circuit has a sensor at a distal end, as for example a surface mount device (SMD) thermistor, a plurality of trace pads at a proximate end, and an interconnecting conductive trace between each trace pad and the sensor. A crimp terminal is respectively crimped onto each trace pad to provide a flexible circuit sensor assembly, wherein the crimp terminals are configured as needed for interfacing with an external circuit. The location of the sensor may be selectively located anywhere on the conductive traces to thereby easily size the probe length of the flexible circuit sensor subassembly to suit a any particular application and fit into any housing. A housing id molded over the flexible circuit sensor assembly. The housing either alone or located in an external shell provides a temperature sensor for a particular purpose. In a variation of the flexible circuit sensor assembly, electronic components can be integrated with the sensor circuit to provide a smart sensor circuit, which may include multiple sensing devices.

10 Claims, 3 Drawing Sheets

TEMPERATURE SENSOR WITH FLEXIBLE CIRCUIT SUBSTRATE

TECHNICAL FIELD

The present invention relates to automotive temperature sensors, and is further related to flexible circuits, wherein the flexible circuit serves as a substrate for the temperature sensor.

BACKGROUND OF THE INVENTION

Temperature sensors are utilized to monitor a variety of automotive systems, including for example coolant temperature and exhaust gas temperature. These sensors typically utilize a wire-type thermistor which is generally soldered to hard-wired leads. Unfortunately, the various automotive applications for temperature sensors precludes a "one fits all" temperature sensor. The multiplicity of temperature sensor types also, therefore, necessitates that each type be uniquely manufactured with little chance for exchange of parts or manufacturing specifications. Major barriers to cost-reduction and/or innovation in automotive temperature sensors are the high terminal tooling costs, high lead-time and cost to make design changes, labor intensity of manufacture, and inability to integrate electronics into the design.

Flexible circuits are well known in the electrical arts, wherein a flexible insulative substrate is printed with flexible electrical circuits, typically in the form of a plurality of elongated, narrow copper traces. If somehow flexible circuit technology could be mated to temperature sensors, it would become possible to provide temperature sensors which overcome the above described disadvantages.

In the art it is known to use surface-mount devices on flexible printed circuits either for temperature sensing for heating, ventilation and air conditioning (HVAC) or temperature compensation, and such devices are made by Delphi-Packard and Berlin. However, these passenger compartment devices are not intended for an "under the hood" environment.

SUMMARY OF THE INVENTION

The present invention is a temperature sensor incorporating flexible circuit technology which allows for replacement of costly wires and lead-frames of the prior art with a generic substrate that commonizes parts, processes, and tooling, as well as enabling electronics integration.

The temperature sensor according to the present invention includes a flexible circuit sensor subassembly composed of a flexible printed circuit substrate on which is printed a sensor circuit. In a preferred example the flexible circuit sensor subassembly, the sensor circuit has a sensor at a distal end, as for example a surface mount device (SMD) thermistor, a plurality of trace pads at a proximate end, and an interconnecting conductive trace between each trace pad and the sensor. A crimp terminal is respectively crimped onto each trace pad to provide a flexible circuit sensor assembly, wherein the crimp terminals are configured as needed for interfacing with an external circuit. The location of the sensor may be selectively located anywhere on the conductive traces to thereby easily size the probe length of the flexible circuit sensor subassembly to suit a any particular application and fit into any housing.

Accordingly, the apparatus for manufacturing the flexible circuit sensor assembly can provide variously configured assemblies, each having particular R-T characteristics, connection systems and probe lengths. Indeed, new parts with custom flexible circuit assemblies can be run with very little tooling investment. The manufacturing process is amenable to automation, and low volume production can be run profitably.

A housing is formed over the flexible circuit sensor assembly. For example, a plastic injection molding process encapsulates the thermistor circuit and fixedly locates the pins of the crimp terminals. The housing either alone or located in an external shell provides a temperature sensor for a particular purpose.

In a variation of the flexible circuit sensor assembly, electronic components can be integrated with the sensor circuit to provide a smart sensor circuit, which may include multiple sensing devices.

Accordingly, it is an object of the present invention to provide a temperature sensor which incorporates flexible printed circuit technology.

This, and additional objects, advantages, features and benefits of the present invention will become apparent from the following specification.

DETAILED DESCRIPTION OF THE PREFERRED EMBODIMENT

Figure 1:
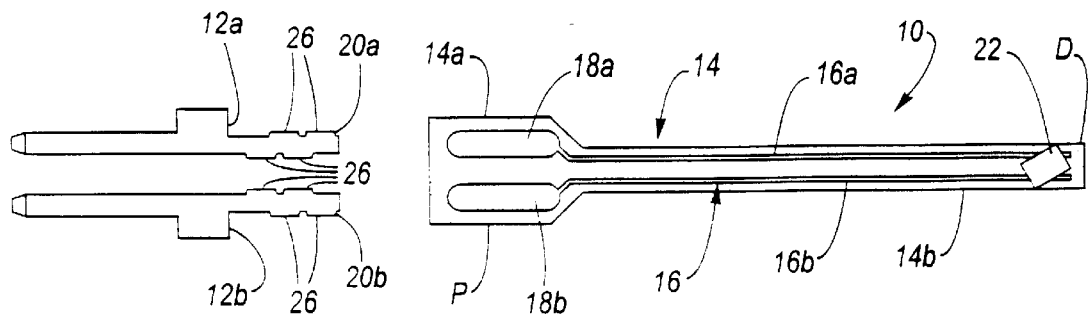
FIG. 1 is a plan view of a flexible circuit sensor subassembly and crimp terminals therefor according to the present invention.

Referring now to the Drawings, FIG. 1 depicts a flexible circuit sensor subassembly 10 and a pair of crimp terminals 12a, 12b. The flexible circuit sensor subassembly 10 includes a flexible circuit substrate 14, on which is printed a sensor circuit 16. The sensor circuit 16 includes a plurality of trace pads 18a, 18b onto which a crimp terminal 20a, 20b is respectively crimped.

The flexible circuit substrate 14 is of a type commonly used in the electrical arts for flexible printed circuits. The flexible circuit substrate 14 is configured to include a base portion 14a at a proximate end P thereof, and a narrower, elongated probe portion 14b wherein the probe portion 14b terminates at a distal end D of the flexible circuit substrate. The sensor circuit 16 is composed of a plurality of flexible conductive (preferably copper) traces 16a, 16b which are formed and adheringly affixed to the flexible circuit substrate in any manner known in the electrical arts. Each conductive trace 16a, 16b of the sensor circuit 16 terminates at the base portion 14a in the form of a trace pad 18a, 18b, respectively. A sensor 22 is affixed to the probe portion 14b of the flexible circuit substrate, preferably at the distal end D thereof, and is in electrical contact with the conductive traces 16a, 16b. A preferred sensor 22 is a surface mount device thermistor.

Figure 2:
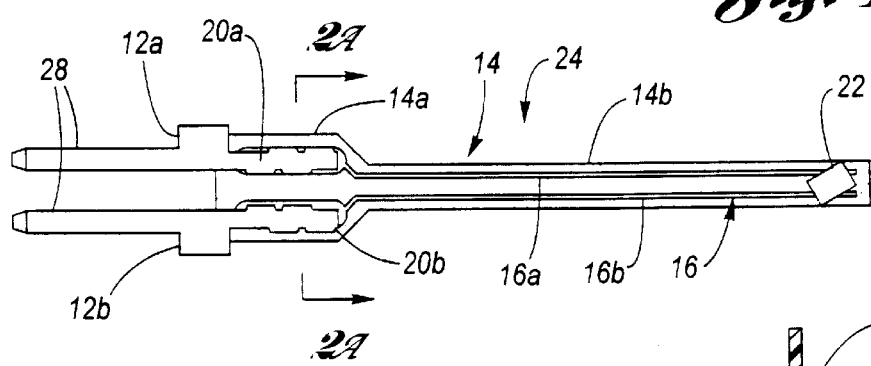
FIG. 2 is a plan view of a flexible circuit sensor assembly according to the present invention.
Figure 2A:
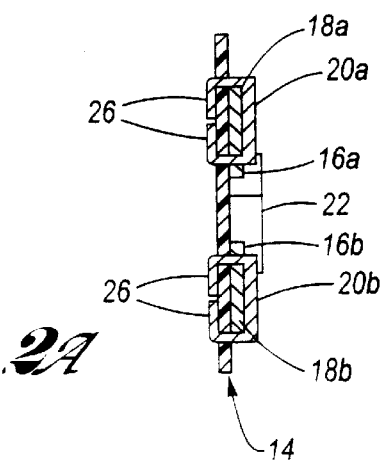
FIG. 2A is a cross-sectional view taken along line 2A—2A in FIG. 2.

Referring now further to FIGS. 2 and 2A, the crimp terminals 20a, 20b each include at one end a crimp pad having a plurality of crimp points 26, and at the opposite end a pin terminal 28. Each crimp terminal 20a, 20b is secured to the flexible circuit substrate 14 and simultaneously electrically connected to a respective one of the conductive traces 16a, 16b by the crimp pad being aligned over a respective trace pad 18a, 18b, then the crimp points 26 being thrust penetratingly through the base portion 14a and then bent back against the opposite side of the flexible circuit substrate to form a flexible circuit sensor assembly 24.

Figure 3:
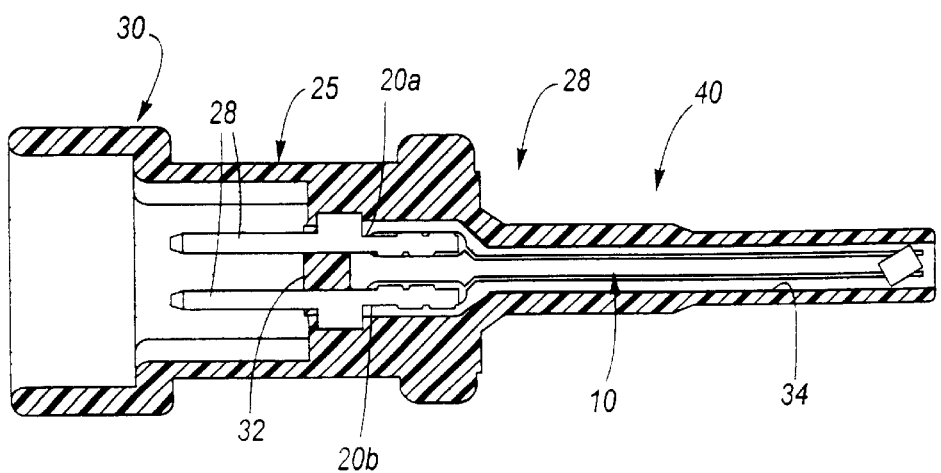
FIG. 3 is a partly sectional view of the flexible circuit sensor assembly of FIG. 2 located in a housing.
Figure 4:
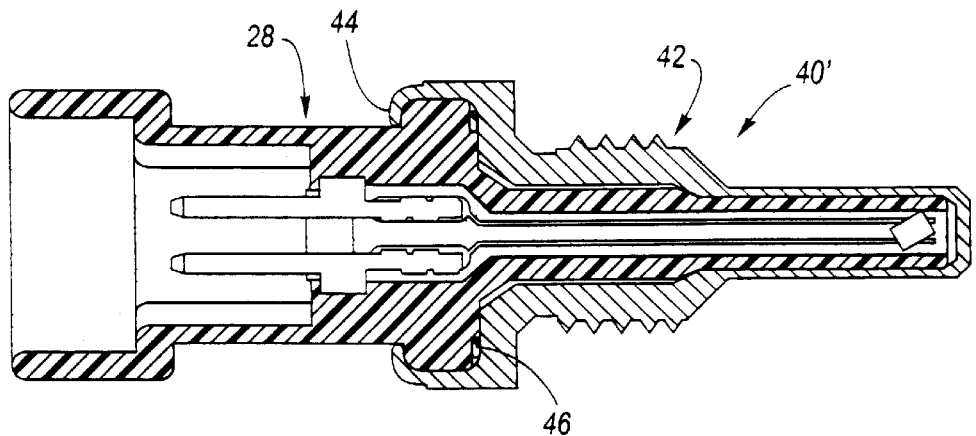
FIG. 4 is a partly cross-sectional view of a first form of a first embodiment of a heat sensor according to the present invention.
Figure 5:
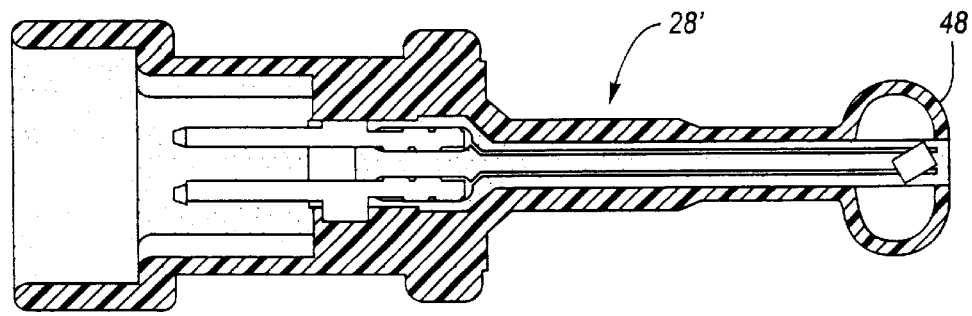
FIG. 5 is a partly cross-sectional view of a second form of the first embodiment of a heat sensor according to the present invention.

As shown at FIG. 3, the flexible circuit sensor assembly 24 of FIG. 2 is next enclosed by a housing 25, to thereby form a housed flexible circuit sensor assembly 28. The housing 25 is preferably a plastic formed by injection molding. In an example for carrying-out the injection molding process, retractable pins hold the flexible circuit sensor subassembly 10 in place in a cavity of a mold tool during the injection of plastic. At a predetermined time, the pins retract into the mold tool at the final moments of the injection process. The housing includes a male connector 30 which is of a predetermined configuration to interface with a complementary connector of an external circuit. The floor 32 of the male connector 30 provides an anchorage for the terminal pins 28 of the crimp terminals 20a, 20b. Depending upon the mold tool design and the injection molding procedure, a housing cavity 34 may be provided whereinside is resident the flexible circuit sensor subassembly 10.

Depending upon final operational criteria, the housed flexible circuit sensor assembly 28 may provide a temperature sensor 40, wherein the sensor 22 is, for example, a thermistor. Or, the housed flexible circuit sensor assembly 28 may be further housed in a shell 42, as for example a metal shell (for example brass) which is roll crimped 44 onto, and gasket 46 sealed with respect to, the housed flexible circuit sensor assembly, to thereby provide a temperature sensor 40'. The final configuration of the temperature sensor may be any consistent with the intended sensor application, as for example a temperature sensor 40" having a housing 25' featuring a bulbous open tip 48.

Figure 6:
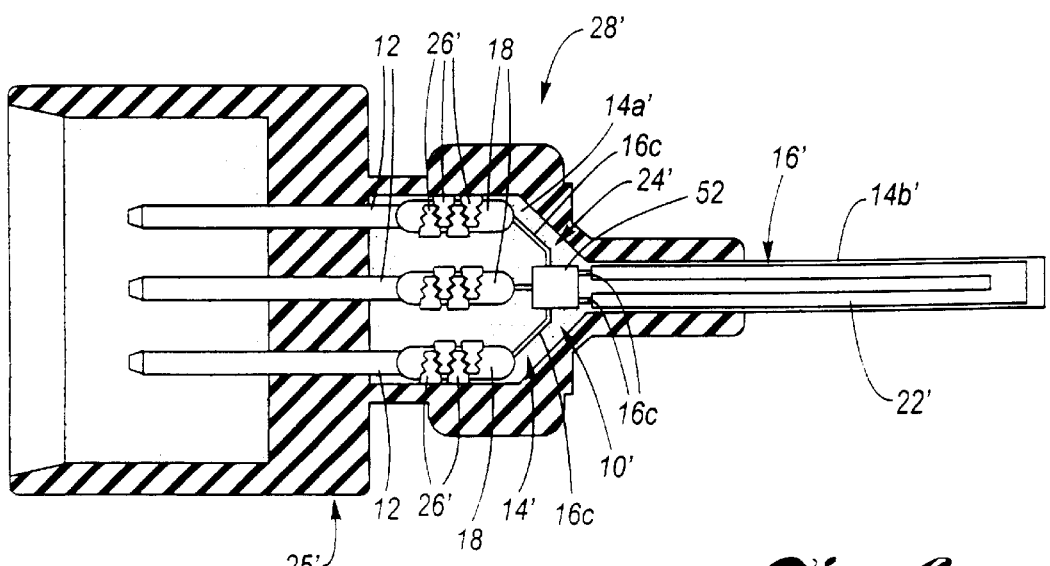
FIG. 6 is a partly cross-sectional view of a housed smart flexible circuit sensor assembly according to the present invention.
Figure 7:
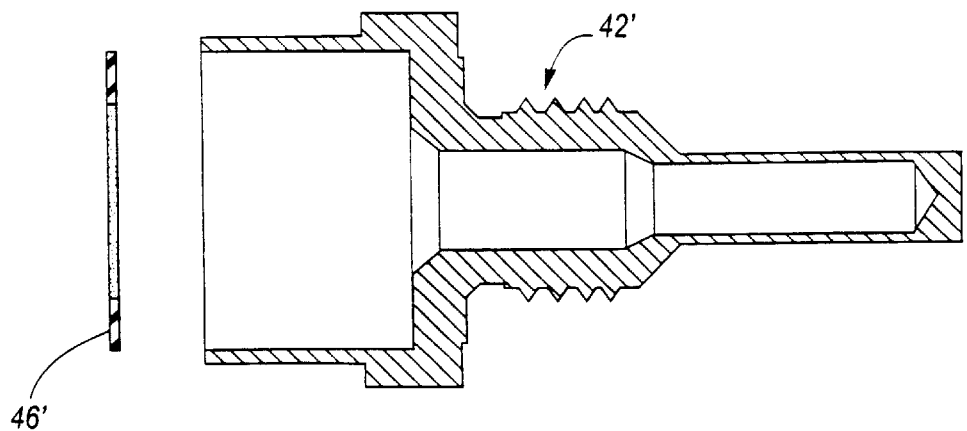
FIG. 7 is a sectional view of an external shell for the housed smart flexible circuit assembly of FIG. 6.
Figure 8:
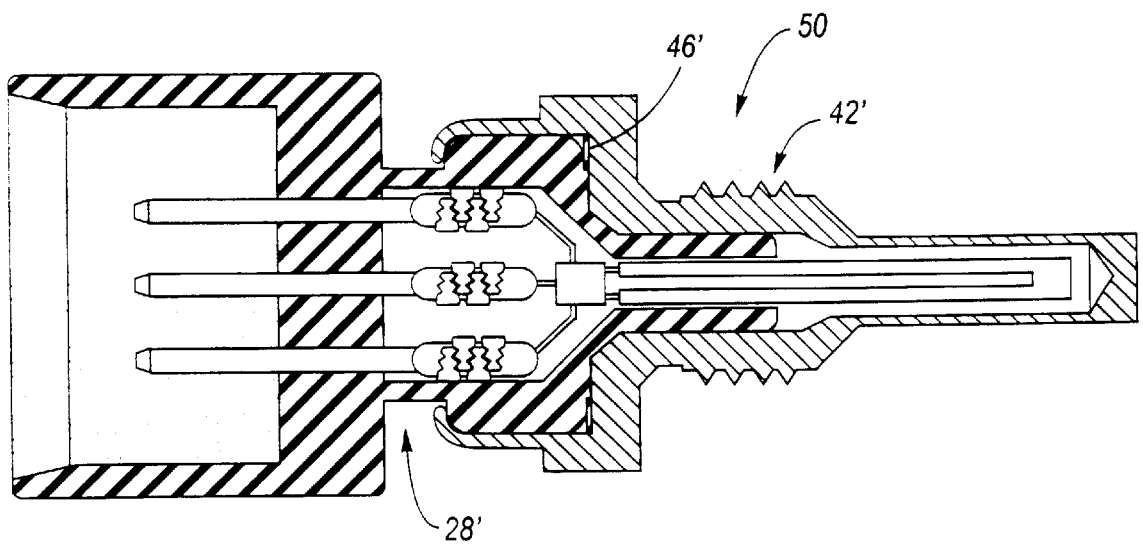
FIG. 8 is a partly sectional view of a smart heat sensor according to the present invention.

Turning attention now to FIGS. 6 through 8, a smart sensor 50, will be detailed.

As shown at FIG. 6, a smart flexible circuit sensor assembly 24' is provided, including a smart flexible circuit sensor subassembly 10'. The smart flexible circuit sensor subassembly 10' includes a flexible circuit substrate 14' generally as disclosed hereinabove, with a probe portion 14b' and a widened base portion 14a'. A smart sensor circuit 16' includes a surface mount device sensor 22' affixed to the flexible circuit substrate, or may be alternatively in the form of any number of conductive traces and one or more sensors at the distal end as more-or-less generally described previously.

There may be any number of trace pads 18, as for example three, as shown. Each trace pad 18 has a crimp terminal 12 crimped thereto via crimp pins 26' in the manner previously described. An electronic device 52, which can be an integrated circuit for providing a signal conditioning circuit, or another electronic component or components, is electrically connected via conductive traces 16c to the smart sensor circuit 16' and is preferably also adhered to the flexible circuit substrate 14'. The electronic device 52 is located between the crimp terminals 12 and the sensor 22'. The smart flexible circuit sensor assembly 24' is captured by a plastic housing 25' which is injection molded therearound as generally described hereinabove to provide a housed smart flexible circuit sensor assembly 28'. In an example of a temperature sensor 50, a gasket 46' is inserted into a brass shell 42' and the housed smart flexible circuit sensor assembly 28' is inserted therein and secured by rolled crimping 44', as shown at FIG. 8.

To those skilled in the art to which this invention appertains, the above described preferred embodiment may be subject to change or modification. For example, the present invention contemplates substitution of other sensors in place of the temperature sensor as exemplified above. Such change or modification, such as for example a modification of the shape of the resilient lock arms, can be carried out without departing from the scope of the invention, which is intended to be limited only by the scope of the appended claims.

What is claimed is:

1. A sensor assembly, comprising:
   a flexible circuit substrate having a base portion and an integral probe portion;
   a sensor circuit printed onto said flexible circuit substrate, said sensor circuit comprising a plurality of trace pads located at said base portion, at least one sensor located at said probe portion, and a plurality of traces interconnecting said at least one sensor with said plurality of trace pads;
   a terminal respectively connected to each trace pad for connecting said sensor circuit to an external electrical circuit; and
   a plastic housing molded over said sensor circuit and said flexible circuit substrate;
   wherein each said terminal comprises a crimp pad for providing a crimped connection to each trace pad, respectively; and
   wherein said housing provides an anchorage for each said terminal.

2. The sensor assembly of claim 1, wherein said probe portion is elongated and narrower in relation to said base portion.

3. The sensor assembly of claim 1, wherein said at least one sensor is a surface mount device thermistor.

4. The sensor assembly of claim 1, further comprising a shell covering a selected portion of said housing.

5. The sensor assembly of claim 4, wherein said at least one sensor is a surface mount device thermistor.

6. A smart sensor assembly, comprising:
   a flexible circuit substrate having a base portion and an integral probe portion;
   a smart sensor circuit printed onto said flexible circuit substrate, said smart sensor circuit comprising a plurality of trace pads located at said base portion, at least one sensor located at said probe portion, an electronic device, and conductive traces for connecting said at least one sensor to said plurality of trace pads through said electronic device;
   a terminal respectively connected to each trace pad for connecting said smart sensor circuit to an external electrical circuit; and
   a plastic housing molded over said sensor circuit and said flexible circuit substrate;

wherein each said terminal comprises a crimp pad for providing a crimped connection to each trace pad, respectively; and wherein said housing provides an anchorage for each said terminal.

7. The sensor assembly of claim 6, wherein said electronic device is a signal conditioning circuit for said at least one sensor.

8. The sensor assembly of claim 6, wherein said at least one sensor is at least one surface mount device thermistor.

9. The sensor assembly of claim 6, further comprising a shell covering a selected portion of said housing.

10. The sensor assembly of claim 9, wherein said at least one sensor is at least one surface mount device thermistor.

* * * * *